(12) United States Patent
Ross et al.

(10) Patent No.: US 8,392,331 B2
(45) Date of Patent: Mar. 5, 2013

(54) HYBRID SECURED CREDIT CARD

(75) Inventors: Erik Stephen Ross, Charlotte, NC (US); James K. Macklin, Skillman, NJ (US); Hans Dirk Schumacher, Matthews, NC (US); David Neil Joffe, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/221,685

(22) Filed: Aug. 30, 2011

(65) Prior Publication Data

US 2012/0197800 A1     Aug. 2, 2012

Related U.S. Application Data

(60) Provisional application No. 61/436,896, filed on Jan. 27, 2011.

(51) Int. Cl.
*G06Q 40/00*     (2012.01)
(52) U.S. Cl. ............................. 705/44; 705/35; 705/41
(58) Field of Classification Search ...................... 705/44
See application file for complete search history.

(56) References Cited

U.S. PATENT DOCUMENTS

| | | | |
|---|---|---|---|
| 5,950,179 A * | 9/1999 | Buchanan et al. .............. | 705/38 |
| 6,158,657 A | 12/2000 | Hall et al. | |
| 7,389,266 B2 | 6/2008 | Early et al. | |
| 7,398,919 B2 | 7/2008 | Cooper | |
| 2003/0004866 A1 | 1/2003 | Huennekens et al. | |
| 2007/0136194 A1 | 6/2007 | Sloan | |
| 2008/0195530 A1 | 8/2008 | Huennekens et al. | |

OTHER PUBLICATIONS

Online Checking Account Benefits, The Reason Why a Secured Charge Card May Work for You, by vette09, Nov. 17, 2010, 3 pages.
Bankrate.com, Credit Cards, 10 questions before getting a secured credit card, Pat Curry, posted Aug. 23, 1999, http://www.bankrate.com/finance/creidt-cards/10-questions-before-getting-a-secured-credit-card-1.aspx, 3 pages.
Bankrate.com, Search Results, Secured Cards, Find the best Secured Cards credit cards, © 2010 Bankrate, Inc., 3 pages.
CreditCardGuide, "Gold Card" Entering Into Second Card Market by Steven Gibbs, Mar. 23, 2010, 1 page.
CreditCardGuide, How to Choose a Secured Credit Card by Eva Norlyk Smith, Ph.D., May 22, 2009, 1 page.
CreditCardGuide, Some New Credit Cards to be Backed by Gold? by Eva Norlyk Smith, Ph.D., Apr. 5, 2010, 2 pages.

(Continued)

*Primary Examiner* — James Vezeris
(74) *Attorney, Agent, or Firm* — Banner & Witcoff, Ltd.; Michael A. Springs

(57) ABSTRACT

According to one or more aspects, financial transactions may be conducted using a financial card product, such as a hybrid secured credit card that permits transactions up to a predetermined total credit limit, and then allows transactions in excess using a security interest in assets. The asset may be the available balance in an interest-bearing checking account (e.g., a DDA account), a brokerage account, or other type of account that may hold funds/assets. The available balance of the asset(s) may be monitored in real-time (or near real-time) such that the available spending limit on the hybrid secured credit card may be floating (e.g., dynamic). In one example, backend systems may be configured to monitor in real-time an available balance in security accounts in order to prevent spending over the amount of secured funds. In addition, in some examples, more than one account may be associated with the card such that the total spending limit on the card is greater. The total spending limit may be calculated through arithmetic (e.g., sum) of the available balance of each of the associated accounts.

20 Claims, 5 Drawing Sheets

OTHER PUBLICATIONS

CreditCardGuide, Is Secured the New Card for Those Under 21? by Steven Gibbs, Jul. 6, 2009, 1 page.

CreditCardGuide, Prepaid Cards on Steriods by Eva Norlyk Smith, Ph.D., Jan. 11, 2010, 1 page.

CreditCardGuide, How is a Secured Credit Card Different from a Prepaid Card? by Eva Norlyk Smith, Ph.D., May 22, 2009, 1 page.

Visa Debit/Check Card FAQ, © 1996-2011 Visa, 4 pages.

Visa Debit/Check Card Visa Extras @ 1996-2011 Visa, 1 page.

* cited by examiner

HYBRID SECURED CREDIT CARD

This application claims priority from U.S. Provisional Patent Application Ser. No. 61/436,896, filed on Jan. 27, 2011. The aforementioned provisional patent application is herein incorporated by reference in its entirety.

OVERVIEW

Financial transactions are conducted in a variety of manners. For example, some individuals conduct financial transactions using currency (e.g., cash) while others use checks, while still others use electronic payment devices such as credit cards or debit cards. Unfortunately, those with ample cash or assets, but with a poor credit rating/score, may be prohibited from using some these payment means, such as credit cards. While secure credit cards exist for those with poor or no credit history, those cards typically require the user to provide fixed collateral (e.g, $500) that is maintained in a separate, unusable account that serves as the secure credit card's security interest in the event of nonpayment of outstanding bills up to the amount of the security interest.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, financial transactions may be conducted using a financial card product. The financial card product may be a hybrid secured card that permits transactions up to a predetermined total credit limit, and then allows transactions in excess through a security interest in an asset. The asset may be the available balance in an interest-bearing checking account (e.g., a DDA account), a brokerage account, or other type of account that may hold funds/assets. The available balance may be monitored in real-time (or near real-time) such that the available spending limit on the card may be floating (e.g., dynamic). In some examples, the card may be associated with an account (e.g., a prefunded account) that does not provide credit protection or protection from exceeding the account balance; meanwhile, in other examples the account may provide such protections in addition to or in lieu of other protections.

In one example, existing front-end point-of-sale terminals (e.g., at a cashier station) and/or ATM terminals may be used without modification with the hybrid secured card. Rather, backend systems may be configured to monitor in real-time an available balance in security accounts in order to prevent spending over the amount of secured funds. In other embodiments, point-of-sale terminals may be modified to permit messages requesting a user to opt-in to make available a secured credit line in excess of the user's predetermined total credit limit on the hybrid secured card product.

In addition, in some examples, more than one account may be associated with a hybrid secured card such that the total spending limit on the card is greater because of the greater secured credit line available over multiple accounts. The total spending limit may be calculated through arithmetic (e.g., sum) of the available balance of each of the associated accounts.

Furthermore, although the term "card" is used throughout, the meaning of the term is not limited to a physical "plastic" card. Rather, a "card," as used herein, includes but is not limited to an electronic device that may serve the purpose of conveying card information (e.g., card number, expiration date, name, and the like) For example, a mobile phone with short-range wireless communication capabilities (e.g., Bluetooth) may be used as a "card."

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
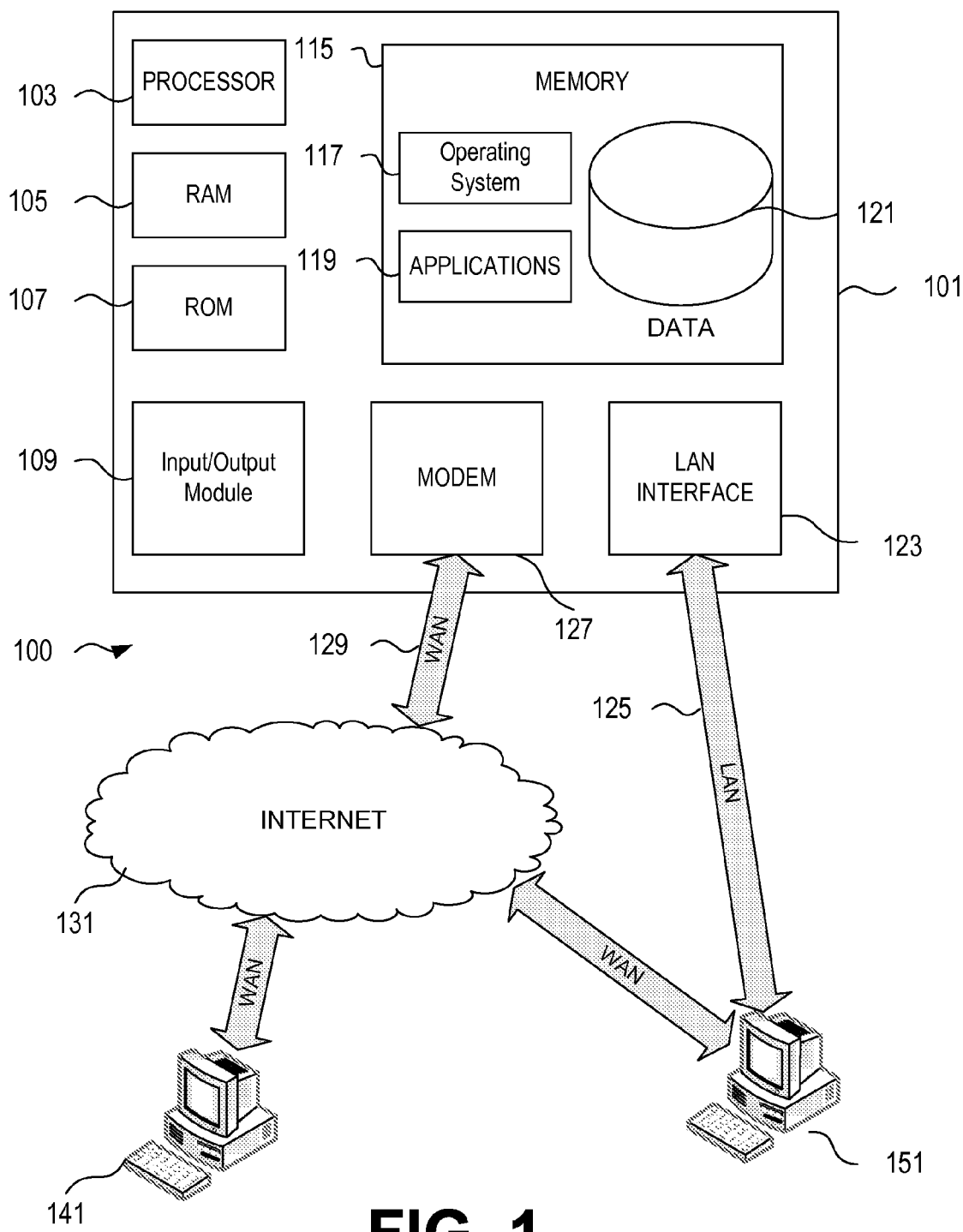
FIG. 1 illustrates an example of a suitable operating environment in which various aspects of the disclosure may be implemented.

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

The disclosure provides a financial product ("a hybrid secured card") that has features that are different from existing debit and credit cards. The hybrid secured credit card provides one or more of the following features: (1) user makes payments monthly, (2) user may pay from any accounts any way they like (e.g., check, autopay, and the like), (3) user's spending line (e.g., credit line) above a predetermined total credit limit may be secured through their deposit relationship (e.g., as a security interest), and (4) the hybrid secured credit card, in some examples, does not debit an asset account through a network (e.g., a deferred debt methodology may be used). The remaining credit line available to a user may be reduced in real time (or near real time) by the customer's spending on the hybrid secured credit card. Meanwhile, when the unpaid transactions on the user's hybrid secured credit card exceed a predetermined total credit limit, portions of the user's deposit account in excess of the limit may be "secured" to guarantee payment of the hybrid secured credit card balance without expressly reducing the account balance. As such, user may continue to earn interest on (or hold assets in) the account through the billing cycle. Upon the payment due date at the end of the billing cycle, the user may pay the balance on the hybrid secured credit card, else authorize payment through use of the "secured" funds in the account. The hybrid secured credit card may also provide for access to margin for purchasing and payment. Meanwhile, in some examples, ATM transactions may be processed as cash advances. The hybrid secured credit card may be implemented, in some embodiments, without requiring new cards be issued to users. Some embodiments of the hybrid secured credit card may offer a rewards program, while other embodiments might not.

In one example a hybrid secured credit card may be associated with a brokerage account where the account serves as a security interest. Features of the card may include one or more of, but are not limited to: providing a credit line "secured" by a user's brokerage account (or by an account (e.g., a guarantor account) designated by the user, which may or may not belong to the user—e.g., a parent designating her account for her child's card); providing access to full available balance of the brokerage account; margin may continue to be accessed for purchasing and payment; available balance may be reduced by the user's spend in real time as is currently practiced in the deferred debit platform; spend is "secured" by brokerage account assets; and rewards points may be earned on spend. ATM features of the card may include one or more of, but not limited to: ATM transactions may be processed as cash advances and not directly debit the brokerage account; additional fees or interest may or may not be charged above the current ATM fee program; and users may maintain brokerage access at ATMs. The billing/statement for the secured card product may provide one or more of the following options: auto pay from brokerage account on due date; auto pay from a direct deposit account (DDA) on due date; paper bill with pay by check; separate card statement/bill for all card activity including ATM included with a brokerage account statement mailing; and payment due on 21st of the following month providing 21 day grace period. One of skill in the art will appreciate after review of the entirety disclosed herein that current compliance/regulatory requirements may require that one or more of these options may be mandatory, thus those features may be desirable in embodiments described herein. However, to the extent that the regulatory framework changes or is removed, the disclosure contemplates embodiments where one or more of these options may or may not be included in embodiments in accordance with the disclosure. One or more of the following benefits may be achieved in some examples of the secured card product: minimal disruption in card usage from the current client experience; rewards program may be maintained; user may select both the card and auto pay through a recorded phone call (or via a written agreement or online, electronic acknowledgment); and no replacement card may be required.

In the foregoing example, a hybrid secured card may be tied to a brokerage account such that the spending limit on the secured card is set by the "cash available" (e.g., available balance) on the account. The "available balance" may be calculated in numerous ways in accordance with the disclosure. For example, the account balance of a DDA account (e.g., a checking account, money market account, savings account, and the like) may be the available balance, assuming no transactions are pending/un-posted on the account. In an account where transactions are pending (e.g., an online bill pay check that is scheduled to be mailed), the available balance may be less than the total cash balance of the account. In addition, in the example of a brokerage account (e.g., a brokerage account used with the trading of stocks/bonds/securities), calculating the available balance may involve determining the current market value of securities/stocks/bonds/and the like in the account multiplied by the number of shares of each instrument, or some subset of investments in such brokerage accounts. Moreover, in some examples, the available balance may include an availability through a margin line. For example, the available balance may be the total cash in a brokerage account plus the total margin available on the account. In addition, in another example, multiple accounts may be designated as a security interest for the secured card. For example, a first account may be designated as the primary account, and a second account may be designated as the secondary account into which the security interest may extend if the available balance in the primary account is inadequate. In another example, an account belonging to another person/entity may be used as security interest, such as a parent providing a card for their son/daughter.

Figure 2:
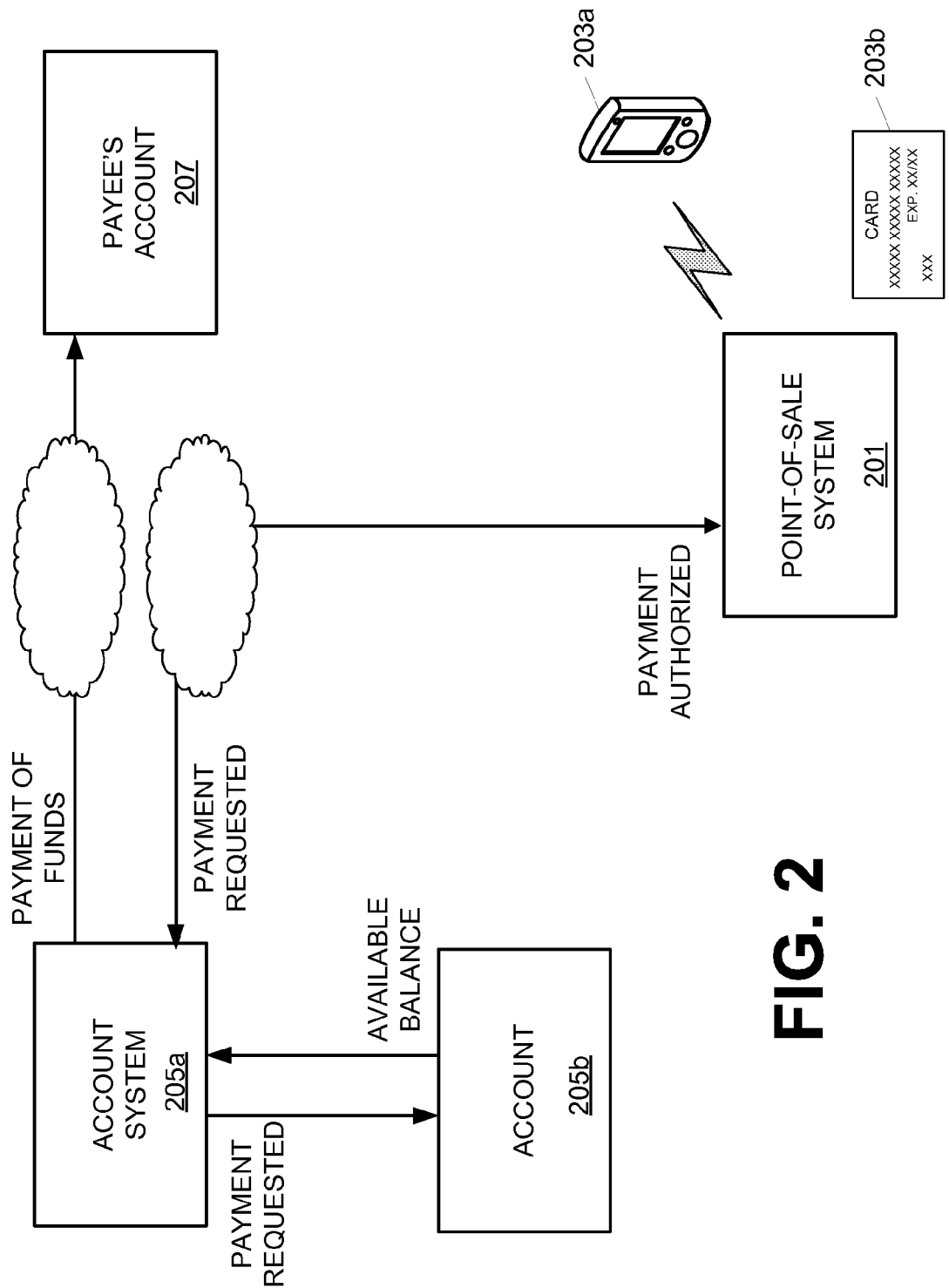
FIG. 2 illustrates an example of a POS payment processing system in which various aspects of the disclosure may be implemented.
Figure 5:
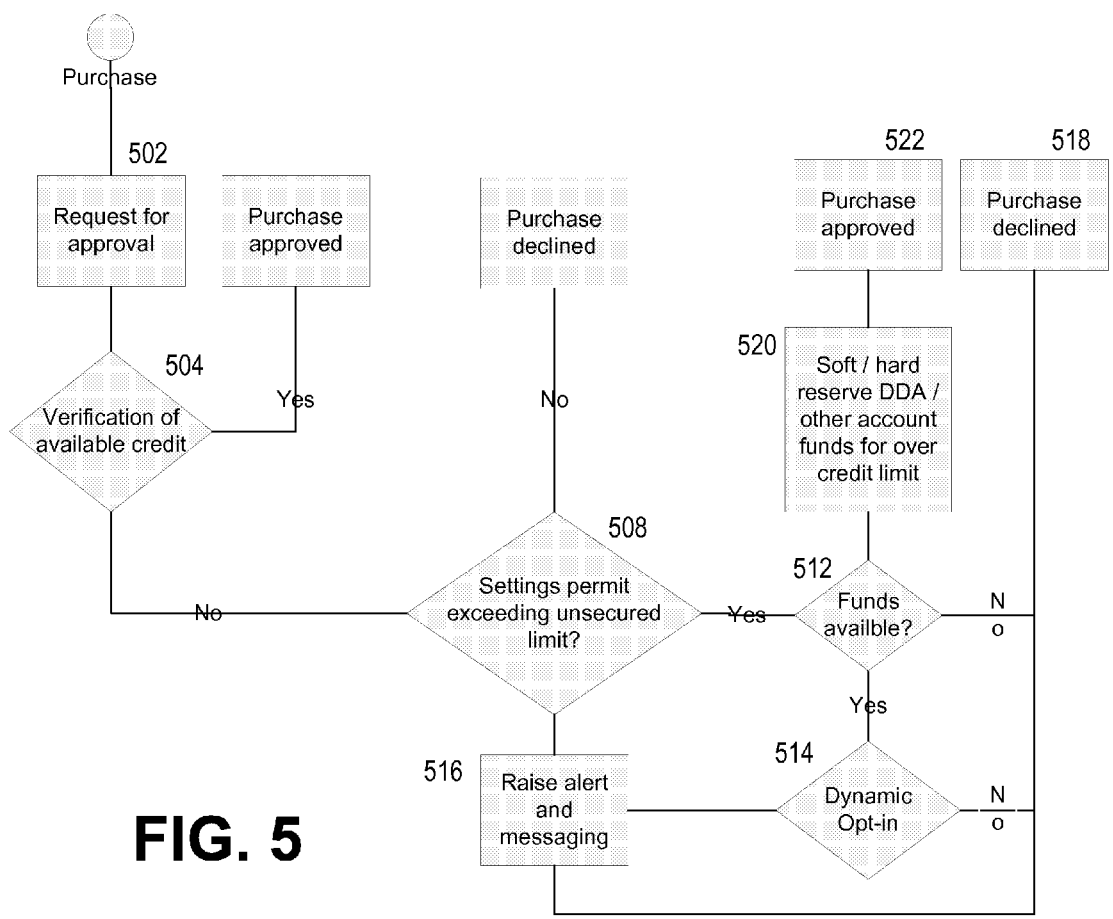
FIG. 5 illustrates a flow of some illustrative processing of a hybrid secured credit card in accordance with various aspects of the disclosure.

FIG. 2 illustrates a payment processing environment in which a consumer or customer may use a hybrid secured credit card (e.g., mobile phone 203a, card 203b, and the like) at a point-of-sale (POS) system 201, to pay one or more bills or purchase products/services. For example, a user may approach a POS terminal (e.g., system 201) in order to pay a grocer bill (e.g., grocer charge) to payee 207 (see FIG. 5, step 502). The user may choose to use a hybrid secured credit card 203b or another payment device such as a mobile communication device 203a (e.g., a mobile phone with short-range wireless communication means). In one or more arrangements, the POS system 201 may contact an account system 205a to process the payment. The account system 205a may verify (see FIG. 5, step 504) the available credit limit on the hybrid secured credit card 203b to determine if the amount of the transaction would cause the available (unsecured) credit limit on the hybrid secured credit card 203b to be exceeded. Assuming the transaction would exceed the limit of the card 203b, instead of declining the card, the system may (optionally) determine if the user's settings indicate (see FIG. 5, step 508) that when the user exceeds the predetermined total credit limit (e.g., $1,000), then the user wishes to create a security interest in assets (e.g., account 205b associated with the hybrid secured credit card) in order to obtain approval of the transaction. In an alternate embodiment, the system may inquire as to available funds (see FIG. 5, step 512) in the associated with account 205b without preforming optional step 508.

The account system 205a may be operated by and/or belong to a financial institution (e.g., bank, credit union, and the like) that is responsible for an account 205b associated with a hybrid secured credit card 203a, 203b. The account system 205a may compare (see FIG. 5, step 512) the amount of the payment requested over the predetermined total credit limit with the available balance on the account 205b. In one example, the available balance may be maintained in real-time such that instant confirmation/denial (i.e., nearly instantaneous approval/denial) may be determined. If the requested payment is authorized, the remaining credit line available to a user may be reduced in real time (or near real time) by the customer's spending on the hybrid secured credit card. For example, on the backend account system 205a a hold (see FIG. 5, step 520) may be placed on a balance of secured account 205b for the amount of the transaction in excess of the total credit limit. With the authorization/approval of the requested payment, the recipient of the payment (i.e., payee 207) may be provided with a payment of funds (see FIG. 5, step 522). One skilled in the art will appreciate that payment to the payee 207 may not be instantaneous in all examples; in some examples, the payment (e.g., posting) may occur on a daily basis or at some other interval of time. Meanwhile, if the requested payment is denied (see FIG. 5, step 518), the account system 205a may provide, in some examples, an explanation for the denial (e.g., a message to the user/cashier indicating that the charge would put the secured card over its current spending limit.) In some examples, the message may be sent to the POS system 201 for immediate display to the user/cashier. Alternatively, the message may be sent through a different channel (e.g., via a SMS to the user's phone number, via a letter to the user's home address, via e-mail to the user's e-mail account, and the like) to the user.

As explained above, account 205b associated with a secured card 203a, 203b may comprise multiple accounts and/or multiple different types of accounts. For example, multiple accounts 205b may be designated as a security interest for a secured card. A first account of the multiple accounts 205b may be designated as a primary account, and a second account of the multiple accounts 205b may be designated as a secondary account into which the security interest may extend if the available balance in the primary account is inadequate. In one example, account system 205a may achieve improved efficiency because it may calculate the available balance for only the first account, and not expend resources calculating the available balance of other accounts unless it becomes necessary to extend into those accounts. In other examples, the account system 205a may calculate the available balance over all of the multiple accounts 205b regardless of a sufficient available balance in the first account. Such an approach may be useful when it's desirable to determine the total available spending limit on a secured card 203a, 203b without necessarily posting a purchase against the card.

Figure 3:
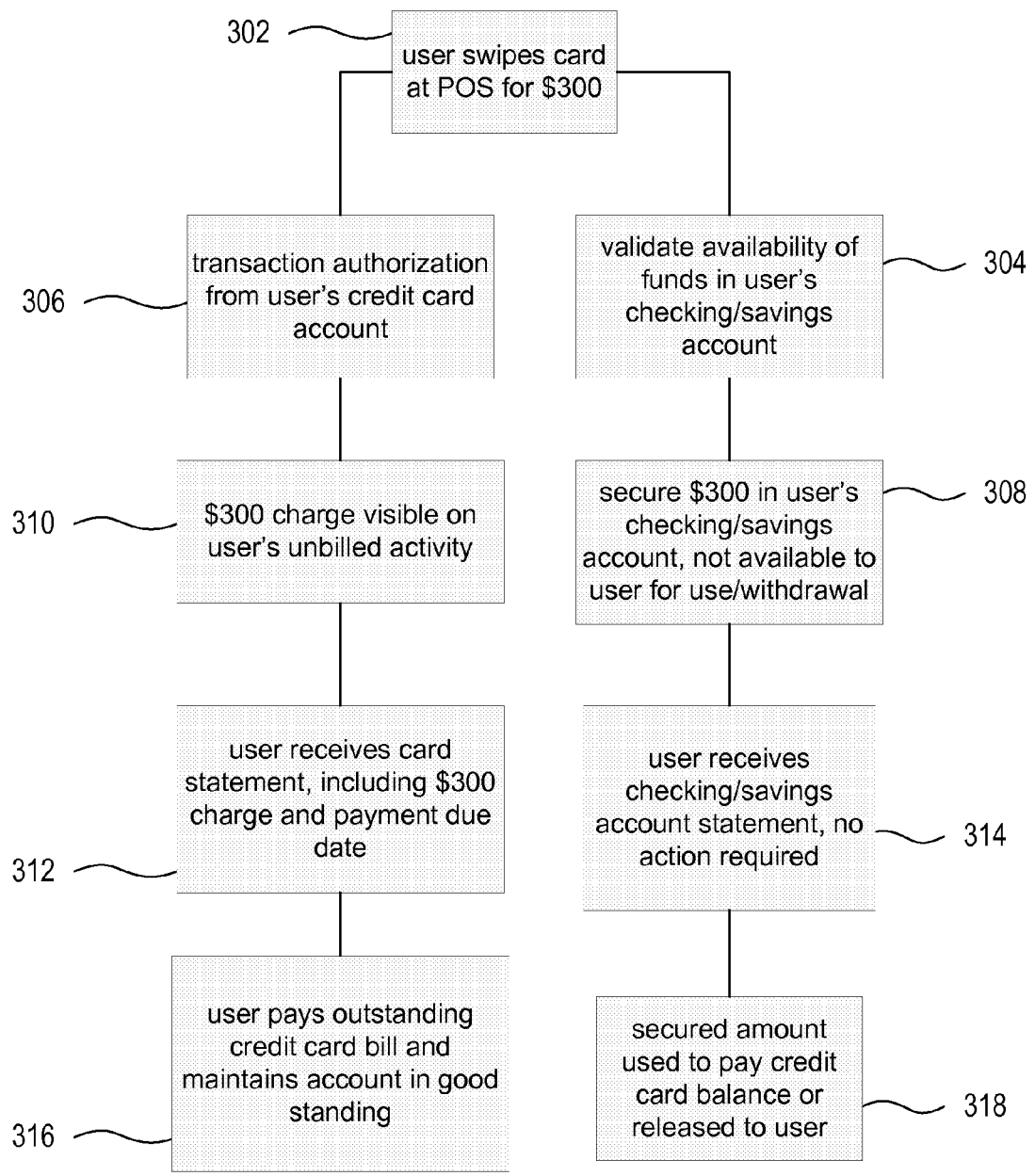
FIG. 3 illustrates a flow of some illustrative processing of a secured card in accordance with various aspects of the disclosure.

In various embodiments in accordance with aspects of the disclosure, known deferred debit methodologies may be used by a backend account system 205a to implement aspects of the secured card feature. For example, a bill may be sent to a user of a secured card at the end of a billing cycle (e.g., end of the month). The funds in the user's account may be locked (e.g., secured), but still available to accrue interest or provide other benefits (e.g., dividends, and the like) As illustrated in FIG. 3, if the user pays the bill (with whatever means he/she desires) before the final due date of the bill, the funds that were previously locked/secured are freed/released. However, if the user fails to pay, the funds in the account may be automatically withdrawn and applied against the outstanding bill that exceeds the predetermined total (unsecured) credit limit.

In some examples the secured card product may implement a modified settlement process in accordance with aspects of a deferred debit methodology. That modified settlement may support the sweeping and/or release of held assets. In one example, Customer A may withdraw $400 from ATM using a secured card line. The card is secured to customer's DDA account. The DDA account has $1,000 balance prior to the transaction. As a result of the transaction, Customer A gets $400 cash, but available balance is reduced to $600 (no fee). Meanwhile, on the backend account system 205a, a real-time check against balance may occur, a hold may be placed on balance of secured account for $400 (i.e., the amount withdrawn), and approval of transaction may be sent to the ATM.

Referring to FIG. 3, Customer B may make a $300 POS transaction (e.g., by using in step 302 the hybrid secured credit card at a grocery store). Assume the card has a predetermined total (secured) credit limit of $1,000 which has already been exhausted. However, the card offers an extended credit line that is secured to customer's DDA/brokerage account. Assume the DDA/brokerage account has $600 available balance prior to the transaction. The card may be treated as a regular credit card by the cashier, and no PIN may be required of Customer B. However, in some examples, the backend account system 205a may generate a message to the user terminal (e.g., POS terminal) requesting the user to opt-in before using the aforementioned secured credit line (see FIG. 5, step 514). In some examples, the message may be a SMS text message (or MMS message) to the user's mobile device, an e-mail message to the user, and/or a textual message for display on the POS terminal (see FIG. 5, step 516). In the case of a textual message displayed on the POS terminal, the user may select "YES" or "NO" to opt-in or -out of the secured credit line. One skilled in the art after review of the entirety disclosed herein will appreciate that in some embodiments the opt-in feature may be omitted in favor of automatically using the secured credit line when a user is exceeds an account limit, but then following up with a message to the user indicating that this has occurred.

Meanwhile, on the backend account system 205a, a fraud check may be performed (optionally), a real-time check against balance may occur (see FIG. 3, step 304), a hold may be placed on a balance of secured account for $300 (DDA/brokerage) (see FIG. 3, step 308), and an indication of approval of the transaction may be sent (see FIG. 3, step 306). As a result, the available balance on the customer's account available for security for subsequent transactions on the hybrid secured credit card may be reduced to the remaining $300 available balance. However, the customer's DDA/brokerage account statement, in one example, will remain unchanged (i.e., the assets in the account will not show as liquidated or sold.) In another example, the statement may show the amount of funds being secured (e.g., locked) due to the hybrid secured credit card's outstanding balance. At a later time, Customer B may be sent a bill for the hybrid secured credit card, which states a $1,300 amount outstanding (i.e., $1,000 through unsecured credit line and $300 through secured credit line) and a payment due date (see FIG. 3, steps 310 and 312). Referring to FIG. 3, Customer B may either pay the bill (see FIG. 3, step 316) using an account of her choice (e.g., another account with the financial institution, paper check, cash, and the like), else the system may automatically remove the portion of funds above the predetermined $1,000 unsecured credit limit (see FIG. 3, step 318) from the associated DDA/brokerage account (e.g., the held assets would be liquidated and applied against the bill.) When the customer's payments have been applied against the outstanding bill, the account system 205a may release the hold (e.g., lock) on the particular assets/funds and increase the available balance on the account accordingly. As a result, the spending limit on the customer's hybrid secured credit card may also be adjusted. In another example, if the customer causes a credit to be applied against their outstanding bill (e.g., if they return an item they purchased at the store the day before using their card), the available balance in their account will reflect an increase as well. Likewise, the spending limit on their hybrid secured credit card may also increase.

In another example, the secured card may be configured (through, for example, business rules created on the account system 205a) to require no or less than full security for particular purchases once the predetermined (unsecured) credit limit has been exhausted. For example, a hybrid secured credit card used to purchase certain types of lower risk items or items that retain their intrinsic value (e.g., gold) may require only half of the purchase price of the item to be secured (e.g., held) in the user's account. In another example, the percentage or amount of security required may be adjusted based on the credit rating/score of a person or other factors. For example, if a user is consistent in making timely payments of their card, over time the percentage of security required may be reduced.

Figure 4:
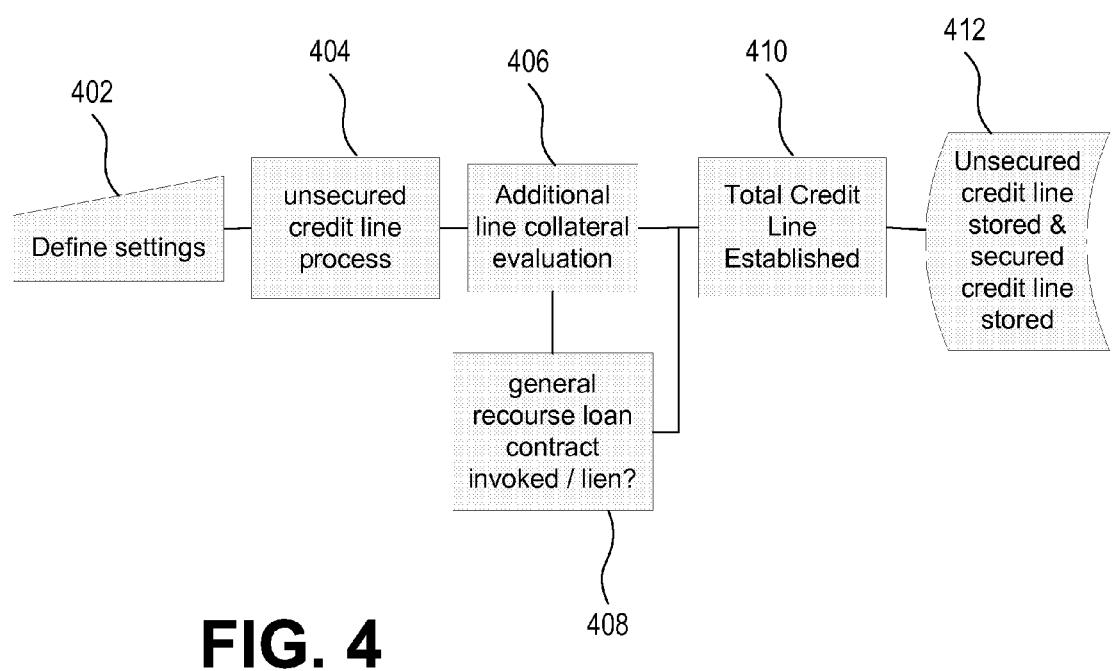
FIG. 4 illustrates a flow of some illustrative backend processing of a hybrid secured credit card in accordance with various aspects of the disclosure.

Referring to FIG. 4, in yet another example, as explained in numerous examples above, a financial institution (or other entity/person) may designate a predetermined total (unsecured) credit limit (e.g., $1,000) and permit a user to spend on the hybrid secured credit card up to that amount without causing a hold on assets in the user's account. The predetermined total credit limit may be set during step 402 as part of the settings associated with the hybrid secured credit card. Other settings include, but are not limited to, whether the user has opted in to extending his predetermined total (unsecured) credit limit using a security interest in assets (e.g., brocherage accounts associated with the hybrid secured credit card). One of skill in the art after review of the entirety disclosed herein will appreciate that one or more of the aforementioned settings may be optional. After the total credit limit amount has been reached, any subsequent charges on the hybrid secured credit card may require the user to have a sufficient available balance in their account to act as a security interest against the charge (see steps 406A and 406B). In one example, an evaluation of additional lines of collateral (e.g., the available balance on DDA accounts, brokerage accounts, guarantor's account, and the like) may occur in step 406A, and the user may enter into general recourse loan contract/agreements (in step 406B) with respect to one or more of these linked accounts available for additional secure line of credit for the hybrid secured credit card. The user may have entered into these contracts/agreements upon registering for the hybrid secured credit card; in an alternate embodiment, the user may not need to enter into a contract for each account/asset he wishes to use as a security interest for the hybrid secured credit card. While the total (unsecured) credit limit is predetermined by the system, the secured credit limit may vary based on the available balance in assets. The total credit limit may be established in step 410 and the credit line information (secured and/or unsecured) may be stored in step 412 for use in providing nearly instantaneous approval/denial of transaction payment requests.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The methods and features recited herein may further be implemented through any number of tangible computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like. The computer-readable instructions may be executed by a processor/device (e.g., the computing device 101) to perform one or more of the steps described herein.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

We claim:

1. A method comprising:
providing a hybrid secured credit card to a user, wherein the card permits transactions exceeding a predetermined total unsecure credit limit using a security interest in assets;
receiving, using a computer network, a request for approval of a transaction of the card user, wherein the request comprises a monetary amount;

verifying, using a computer processor, an available unsecure credit limit on the card, including determining that the monetary amount of the request is greater than the available unsecure credit limit on the card;

validating, using a computer processor, an available balance of the assets, including determining that the monetary amount of the request is less than the available balance of the assets;

securing, using the computer processor, no more than the monetary amount of the request against the assets; and sending, using the computer network, an approval of the transaction in response to the request.

2. The method of claim 1, wherein the security interest is in a brokerage account of the user and extends to a margin line available to the user.

3. The method of claim 2, wherein the validating includes:
calculating, using the computer processor, an available balance of the brokerage account and the margin line by determining a market value of all assets in the brokerage account and an availability of funds through the margin line.

4. The method of claim 1, wherein the validating is performed in real-time, and a determination of approval or denial of the transaction is nearly instantaneous, the method further comprising:
generating a message to the user requesting their opt-in to exceed the predetermined total unsecure credit limit and securing excess using the security interest in the assets, wherein the message is at least one of a SMS message, e-mail message, or textual message for display on a point-of-sale device.

5. The method of claim 1, wherein the security interest in the assets is in multiple accounts of the user, wherein a first account of the multiple accounts is a primary account and a second account of the multiple accounts is a secondary account into which the security interest in the assets extends when an available balance in the first account is exceeds an account limit of the first account.

6. The method of claim 1, wherein the card is provided to a user, but the assets through which the card is secured are owned by a guarantor of the user.

7. The method of claim 2, wherein the securing of the monetary amount of the request against the assets does not interrupt accrual of interest payments in the assets, and does not liquidate assets held in the brokerage account.

8. The method of claim 1, wherein the available balance of the assets is adjusted upwards when items purchased using the card are returned and a credit it applied against outstanding charges on the card.

9. The method of claim 1, comprising:
sending a bill to the user for purchases made using the card during an interval of time;
determining, using the computer processor, that the bill has not been paid; and
liquidating a portion of the assets to apply towards the unpaid bill, wherein the portion of the assets equals an amount of the bill above the predetermined total unsecure credit limit that has not been paid.

10. The method of claim 1, comprising:
sending a bill to the user for purchases made using the card during an interval of time;
determining, using the computer processor, that the bill has been paid; and
releasing a portion of the assets secured against the bill.

11. The method of claim 1, wherein less than the monetary amount of the request is secured against the assets in the securing step when an item being purchased using the card retains its intrinsic value.

12. The method of claim 1, wherein less than the monetary amount of the request is secured against the assets in the securing step based on a credit rating of the user.

13. The method of claim 1, wherein the card is embodied in a mobile communications device.

14. An apparatus comprising:
a computer processor for executing computer-executable instructions; and
a computer-readable medium storing the computer-executable instructions, which when executed by the computer processor, cause the apparatus to:
receive, using a computer network, a request for approval of a transaction of a user of a hybrid secured credit card, wherein the request comprises a monetary amount, and wherein the card permits transactions in excess of a predetermined total unsecure credit limit through a security interest in a brokerage account of the user and extends to a margin line available to the user;
calculate, using a computer processor, an available balance of the brokerage account and the margin line by determining a market value of all assets in the brokerage account and an availability of funds through the margin line;
determine, using the computer processor, that the monetary amount of the request is in excess of an available credit limit remaining on the card, but is less than the calculated available balance;
secure, using the computer processor, the monetary amount of the request against the brokerage account and the margin line; and
send, using the computer network, an approval of the transaction in response to the request.

15. The apparatus of claim 14, wherein the brokerage account through which the card is secured is owned by a guarantor of the user.

16. The apparatus of claim 14, wherein the securing of the monetary amount of the request does not interrupt accrual of dividends in the brokerage account.

17. The apparatus of claim 14, the computer-readable medium further storing computer-executable instructions, which when executed by the computer processor, cause the apparatus to:
send a bill to the user for purchases made using the card during an interval of time;
determine, using the computer processor, that the bill has not been paid; and
liquidate a portion of the assets to apply towards the unpaid bill, wherein the portion of the assets equals an amount of the bill above the predetermined total unsecure credit limit that has not been paid.

18. A non-transitory computer-readable medium storing computer-executable instructions, which when executed by a processor, cause the processor to perform steps comprising:
receiving a request for approval of a transaction of a user of a hybrid secured credit card, wherein the request comprises a monetary amount, and wherein the card permits transactions greater than a predetermined total unsecure credit limit through a security interest in assets
validating, using a computer processor, an available balance of the assets, including determining that the monetary amount of the request is less than the available balance of the assets;

securing, using the computer processor, no more than the monetary amount of the request against the assets; and sending an approval of the transaction in response to the request.

19. The computer-readable medium of claim 18, wherein the security interest is in a brokerage account of the user and extends to a margin line available to the user, and wherein the validating includes calculating an available balance of the brokerage account and the margin line by determining a market value of all assets in the brokerage account and an availability of funds through the margin line.

20. The computer-readable medium of claim 18, wherein less than the monetary amount of the request is secured against the assets in the securing step when an item being purchased using the card retains its intrinsic value or is a lower risk item.

* * * * *